US007676230B2

(12) United States Patent
Kang et al.

(10) Patent No.: US 7,676,230 B2
(45) Date of Patent: Mar. 9, 2010

(54) SYSTEM AND METHOD FOR ALLOCATING A CHANNEL QUALITY INFORMATION CHANNEL IN A COMMUNICATION SYSTEM

(75) Inventors: Hyun-Jeong Kang, Seoul (KR);
Hyoung-Kyu Lim, Seoul (KR);
Chang-Hoi Koo, Seongnam-si (KR);
Hong-Sung Chang, Suwon-si (KR);
Yeong-Moon Son, Anyang-si (KR);
Sung-Jin Lee, Suwon-si (KR); Jung-Je Son, Seongnam-si (KR); Jae-Weon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 927 days.

(21) Appl. No.: 11/328,828

(22) Filed: Jan. 10, 2006

(65) Prior Publication Data

US 2006/0154671 A1 Jul. 13, 2006

(30) Foreign Application Priority Data

Jan. 10, 2005 (KR) ............... 10-2005-0002327

(51) Int. Cl.
*H04Q 7/20* (2006.01)
(52) U.S. Cl. .............. 455/450; 455/437; 455/436; 370/329; 370/331
(58) Field of Classification Search .......... 455/450, 455/437, 436; 370/331; 714/776
See application file for complete search history.

(56) References Cited

U.S. PATENT DOCUMENTS 6,687,225 B1  2/2004  Kawarai et al.

| 7,124,350 | B2 * | 10/2006 | Chao et al. ............... 714/776 |
| 2003/0232622 | A1 * | 12/2003 | Seo et al. .................. 455/437 |
| 2005/0068917 | A1 * | 3/2005 | Sayeedi ..................... 370/328 |
| 2006/0013185 | A1 | 1/2006 | Seo et al. |

FOREIGN PATENT DOCUMENTS

| JP | 08-331637 | 12/1996 |
| JP | 2000-151630 | 5/2000 |
| JP | 2001-028776 | 1/2001 |
| JP | 2001-095029 | 4/2001 |
| KR | 2003/0019210 | 3/2003 |
| KR | 2003/0046272 | 6/2003 |
| RU | 2 185 028 | 6/1997 |
| RU | 2 237 975 | 10/2004 |
| WO | WO 95/026094 | 9/1995 |
| WO | WO 02/080401 | 10/2002 |
| WO | WO 2004/098221 | 11/2004 |

OTHER PUBLICATIONS

Draft IEEE Standard for Local and Metropolitan Area Networks; Part 16: Air Interface for Fixed and Mobile Broadband Wireless Access Systems; Amendment for Physical and Medium Access Control Layers for Combined Fixed and Mobile Operation in Licensed Bands, Sep. 18, 2004.

* cited by examiner

*Primary Examiner*—Danh C Le
(74) *Attorney, Agent, or Firm*—The Farrell Law Firm, LLP

(57) ABSTRACT

A method for allocating a channel quality information channel (CQICH) in a communication system is disclosed. After fast switching from a serving anchor base station (BS) to a target anchor BS, a mobile station (MS) detects absence of a CQICH allocated from the target anchor BS. Upon detecting the absence of the allocated CQICH, the MS sends a request for allocating the CQICH to the target anchor BS. Upon receiving the CQICH allocation request, the target anchor BS detects a need to allocate a CQICH to the MS.

14 Claims, 5 Drawing Sheets

SYSTEM AND METHOD FOR ALLOCATING A CHANNEL QUALITY INFORMATION CHANNEL IN A COMMUNICATION SYSTEM

PRIORITY

This application claims priority under 35 U.S.C. § 119 to an application filed in the Korean Intellectual Property Office on Jan. 10, 2005 and assigned Serial No. 2005-2327, the contents of which are incorporated herein by reference.

BACKGROUND OF THE INVENTION

1. Field of the Invention

The present invention relates generally to a system and method for allocating a Channel Quality Information Channel (CQICH) in a communication system.

2. Description of the Related Art

Active research on the next generation communication system is being conducted to provide users with desired services which can meet a desired Quality-of-Service (QoS) at a high data rate.

A wireless Local Area Network (LAN) communication system and a wireless Metropolitan Area Network (MAN) communication system support a high data rate. The wireless MAN communication system, one of the typical Broadband Wireless Access (BWA) communication systems, has broader service coverage and supports a higher data rate, compared with the wireless LAN communication system. Therefore, active research on the next generation communication system is being conducted to develop a new communication system that guarantees mobility of a mobile station (MS) and QoS to the wireless LAN communication system and the wireless MAN communication system, both of which guarantee a higher data rate, to thereby support a higher data rate of the next generation communication system.

A system employing an Orthogonal Frequency Division Multiplexing (OFDM) scheme and/or an Orthogonal Frequency Division Multiple Access (OFDMA) scheme to support a broadband transmission network for physical channels of the wireless MAN communication system is known as an Institute of Electrical and Electronics Engineers (IEEE) 802.16 communication system. The IEEE 802.16 communication system, applies the OFDM/OFDMA scheme to the wireless MAN communication system, and can therefore support high-speed data transmission by transmitting physical channel signals using a plurality of subcarriers. For convenience, the following description will be made with reference to the IEEE 802.16 communication system, one of the typical BWA communication systems.

A description will now be made of a Fast Base Station Switching (FBSS) scheme among various handover schemes for connection switching from a serving base station (BS) to a target BS in the IEEE 802.16 communication system.

The FBSS scheme is a handover scheme that uses selection diversity and fast switching mechanism to improve link quality. In the FBSS scheme, a mobile station (MS) exchanges signals with only one active BS, i.e., an anchor BS, among active BSs included in the MS's diversity set. The anchor BS is a type of serving BS, and is replaceable (or switchable) according to a BS selection scheme of the MS. A description will now be made of the diversity set.

Each of active BSs constituting the MS's diversity set is distinguished with a temporary BS indicator (Temp BS ID), and all of the active BSs constituting the diversity set share capability, security parameters, service parameters, and full Medium Access Control (MAC) context information of the corresponding MS. Each of the active BSs constituting the diversity set can be excluded from the diversity set or a new BS currently not included in the diversity set can be added to the diversity set as a new active BS according to strength of a signal received (by the MS) from each active BS.

The MS selects one of the active BSs constituting the diversity set as an anchor BS. In this case, strength, for example, carrier-to-interference and noise ratio (CINR), of a signal received from the active BS selected as the anchor BS is highest, compared with CINRs of signals transmitted by the other active BSs constituting the diversity set. Therefore, in the FBSS scheme, the MS "performs communication" with only the anchor BS. The anchor BS that currently communicates with the MS will be referred to as a "serving anchor BS." The MS measures signal quality for each of the active BSs constituting the diversity set while communicating with the serving anchor BS. Measuring the signal quality means measuring a CINR of the corresponding signal. Upon detecting the presence of any active BS providing higher signal quality than that of the current serving anchor BS as a result of the signal quality measurement, the MS determines to handover from the serving anchor BS to the active BS that provides the higher signal quality than that of the current serving anchor BS, accomplishing fast switching. Herein, an active BS, to which the MS performs fast switching, that provides a higher signal quality than that of the current serving anchor BS will be referred to as a "target anchor BS."

With reference to FIG. 1, a description of an FBSS-based fast switching operation of an MS in a conventional IEEE 802.16 communication system will now be given. FIG. 1 is a flowchart illustrating an FBSS-based fast switching operation of an MS in a conventional IEEE 802.16 communication system.

Referring to FIG. 1, an MS performs communication with a serving anchor BS in step 101. Thereafter, the MS measures signal quality for each active BSs constituting the MS's diversity set in step 103. Herein, the phrase an MS performs communication with a serving anchor BS means that allocation information for the MS is included in MAP messages, i.e., a downlink MAP (DL-MAP) message and an uplink MAP (UL-MAP) message, transmitted by the serving anchor BS.

The MS determines in step 105 whether it should switch the serving anchor BS, i.e., it should perform a fast switching operation. Herein, the MS determines to switch the serving anchor BS if there is any active BS having a higher signal quality than that of the serving anchor BS. If there is no need to switch the anchor BS as a result of the determination, the MS returns to step 101. However, if it is determined in step 105 that there is a need to switch the anchor BS, the MS proceeds to step 107.

In step 107, the MS detects a start point of a switch period. Herein, the switch period refers to a period in which an MS reports a serving anchor BS that it will perform a fast switching operation to a new active BS, i.e., a target anchor BS, rather than the serving anchor BS. The switch period will be described later in detail with reference to FIG. 2. In step 109, after detecting the start point of the switch period, the MS transmits a Temp BS ID of a target anchor BS to which it will perform a fast switching operation from the serving anchor BS, to the serving anchor BS in the switch period. Herein, the MS transmits the Temp BS ID of the target anchor BS (i.e., a codeword corresponding to the Temp BS ID), to the serving anchor BS through a CQICH allocated from the serving anchor BS. The CQICH is a channel used by the MS to transmit a control signal in a process of feeding back a Channel quality information (CQI) value of the serving anchor BS or performing an FBSS-based fast switching operation.

Possible codewords mapped to corresponding Temp BS IDs are shown in Table 1 below.

TABLE 1

| Value | Description |
| --- | --- |
| 0b100000 | Active BS for TEMP_BS_ID = 000 |
| 0b100001 | Active BS for TEMP_BS_ID = 001 |
| 0b100010 | Active BS for TEMP_BS_ID = 010 |
| 0b100011 | Active BS for TEMP_BS_ID = 011 |
| 0b100100 | Active BS for TEMP_BS_ID = 100 |
| 0b100101 | Active BS for TEMP_BS_ID = 101 |
| 0b100110 | Active BS for TEMP_BS_ID = 110 |
| 0b100111 | Active BS for TEMP_BS_ID = 111 |
| 0b101000 | Acknowledgement of Receipt of Anchor BS Switch IE |

In Table 1, "Value" represents codewords mapped to corresponding Temp BS IDs of active BSs. For example, if the MS desires to perform fast switching from a serving anchor BS to a target anchor BS with Temp BS ID="011", the MS transmits a codeword "0b100011" mapped to the Temp BS ID='011' to the serving anchor BS through a CQICH. In Table 1, a codeword '0b101000' is not a codeword mapped to a Temp BS ID of an active BS, but is a codeword used by the serving anchor BS to inform the MS that it has received a transmitted anchor BS switch Information Element (Anchor BS Switch IE). A format of the Anchor BS Switch IE will be described later in detail.

In step 111, the MS transmits a CQI value for the serving anchor BS through a CQICH being identical to the CQICH used for transmitting a codeword mapped to the Temp BS ID of the target anchor BS. The MS determines in step 113 whether an Anchor BS Switch IE indicating a fast switching cancel request to the target anchor BS is received from the serving anchor BS. A format of the Anchor BS Switch IE is shown in Table 2.

TABLE 2

| Syntax | Size | Notes |
| --- | --- | --- |
| Anchor BS Switch IE( ){ | | |
| N_Anchor BS_Switch | 4bits | Number of Anchor BS switching indicated in this IE |
| for(i=0;i<N_Anchor BS_Switch;i++){ | | |
|     CID | 16bits | Basic CID of a MS whose anchor BS switching is indicated in this IE |
|     Action code | 2bits | 00—The MS shall switch to the Anchor BS specified in the fast Anchor BS selection information in the Fast-feedback channel, at the default time specified by the switching period defined in the DCD<br>01—The MS shall switch to the Anchor BS specified in this IE and at the action time specified in this IE<br>10—The MS shall cancel all anchor switching procedure, stop switching timer and remain on the current anchor BS<br>11—reserved |
|     if (Action code ==01){ | | |
|         Action time(A) | 3bits | In units of frames, 000 means the MS shall switch at the default time specified by the switching period defined in DCD |
|         TEMP BS ID | 3bits | TEMP BS ID of the anchor BS to switch to. |
|     } | | |
|     If(Action code==00 \|\| Action code==01){ | | |
|         CQICH Allocation Indicator | 1bit | To indicate if CQICH allocation at the new Anchor BS is included in this IE |
|         if(CQICH Allocation Indicator ==1){ | | |
|             CQICH ID | Variable | Index to uniquely identify the CQICH resource assigned to the MS after the MS switched to the new Anchor BS |
|             Feedback channel offset | 6bits | Index to the Fast feedback channel region of the new Anchor BS marked by UIUC = 0 |
|             Period(p) | 2bits | A CQI feedback is transmitted on the CQICH every $2^p$ frames |
|             Frame offset | 3bits | The MS starts reporting at the frame of which the number has the same 3 LSB as the specified frame offset. If the current frame is specified, the MS should start reporting in 8 frames. |
|             Duration(d) | 3bits | A CQI feedback is transmitted on the CQI channels indexed by the CQICH ID for frames<br>if d = 0, the CQICH is deallocated<br>if d = 111, the MS should report until the BS commend for the MS to stop |
|         } | | |
|     } | | |
| } | | |

In Table 2, N_Anchor BS_Switch represents the number of anchor BS fast switching informations included in the Anchor BS Switch IE, and the Anchor BS Switch IE can include anchor BS fast switching informations allocated to a plurality of MSs because it is included in a MAP message before being broadcasted. Herein, the number of anchor BS fast switching informations is equivalent to "N_Anchor BS_Switch", and each of "anchor BS fast switching informations" is equivalent to each of informations in "for (i=0; i<N_Anchor BS_Switch; i++)" structure. The Anchor BS Switch IE includes a Connection Identifier (CID) for each of the anchor BS fast switching informations, an Action code, and CQICH allocation information for the Action code. The CID represents a basic CID for each MS, and the Action code represents information on a switch period in which the MS fast-switches to the target anchor BS, or information used for commanding the MS to fast-switch to a target anchor BS indicated by the serving anchor BS in a period (i.e., a switch period), indicated by the serving anchor BS, or for commending the MS to cancel the fast switching.

As shown in Table 2, Action code="00" indicates that the MS should perform a fast switching operation to the target anchor BS at a default time in a switch period defined in a Downlink Channel Descriptor (DCD) message, Action code='01' indicates that the MS should perform a fast switching operation to the target anchor BS at an action time specified in the Anchor BS Switch IE, and Action code='10' indicates that the MS should cancel the fast switching operation and maintain communication with the serving anchor BS.

In Table 2, CQICH Allocation Indicator represents CQICH allocation information to be used by the MS in the target anchor BS. The CQICH allocation information includes CQICH ID, Feedback channel offset indicating a position of a CQICH actually allocated to the MS in a CQI field defined in a UL-MAP message, Period (p) indicating a period in which the MS reports a CQI value, Frame offset indicating a time at which the MS starts reporting a CQI value, and Duration (d) indicating information on effective duration of a CQICH allocated from the target anchor BS. Therefore, an MS, receiving the CQICH allocation information, reports a CQI value to the target anchor BS through the CQICH every $2^p$ frame for frame duration after the Frame offset time.

If it is determined in step 113 that an Anchor BS Switch IE indicating a fast switching cancel request to the target anchor BS is received from the serving anchor BS (i.e., the Action code is set to "10"), the MS proceeds to step 115. In step 115, the MS cancels a fast switching operation (from the serving anchor BS to the target anchor BS), and then ends the process.

However, if it is determined in step 113 that an Anchor BS Switch IE indicating a fast switching cancel request to the target anchor BS is not received from the serving anchor BS, the MS proceeds to step 117 where it determines whether the switch period has expired. If it is determined that the switch period has not expired, the MS returns to step 109 where it can repeatedly transmit information indicating a desired fast switching operation to the target anchor BS (i.e., the MS transmits a codeword mapped to a Temp BS ID of the target anchor BS), to the serving anchor BS. The repeated transmission of the codeword mapped to the Temp BS ID of the target anchor BS continues until the switch period has expired in step 117 or the Anchor BS Switch IE indicating a fast switching cancel request to the target anchor BS is received from the serving anchor BS in step 113 even though the switch period has not expired.

If it is determined in step 117 that the switch period has expired, the MS proceeds to step 119 where it determines whether CQICH allocation information to be used in the target anchor BS has been received from the serving anchor BS. Herein, the MS can be aware of the CQICH allocation information to be used in the target anchor BS through CQICH allocation information previously allocated before the MS performs a fast switching operation from the serving anchor BS to the target anchor BS, or through Anchor BS Switch IE shown in Table 2 for the switch period. Alternatively, even in the process of adding a new active BS to it's the MS's diversity set, the MS can acquire CQICH allocation information of the active BS through a handover control message. The operation of managing the diversity set through the handover control message will not be further described herein because it is not directly related to the present invention.

If it is determined in step 119 that the CQICH allocation information to be used in the target anchor BS has not been received, the MS proceeds to step 121 where it performs a fast switching operation from the serving anchor BS to the target anchor BS and then waits a preset time. Further, the MS determines whether CQICH allocation information is received through a MAP message broadcasted by the target anchor BS within the preset time. A format of CQICH allocation information, i.e., CQICH Alloc IE, in the MAP message including the CQICH allocation information is shown in Table 3 below.

TABLE 3

| Syntax | Size | Notes |
|---|---|---|
| CQICH Alloc IE | | |
| CQICH ID | Variable | Index to uniquely identify the CQICH resource assigned to the MS The size of this field is dependent on system parameter defined in DCD |
| Feedback channel offset | 6bits | Index to the Fast feedback channel region marked by UIUC = 0 |
| Period(p) | 2bits | A CQI feedback is transmitted on the CQICH every $2^p$ frames |
| Frame offset | 3bits | The MS starts reporting at the frame of which the number has the same 3 LSB as the specified frame offset. If the current frame is specified, the MS should start reporting in 8frames. |
| Duration(d) | 3bits | A CQI feedback is transmitted on the CQI channels indexed by the CQICH ID for frames if d = 0, the CQICH is deallocated if d = 111, the MS should report until the BS commend for the MS to stop |
| } | | |
| } | | |
| } | | |

In Table 3, CQICH Alloc IE allocated in a target anchor BS indicates CQICH allocation information used by an MS to exchange control signals with the target anchor BS, and the CQICH Alloc IE includes CQICH ID, Feedback channel offset for providing actual location information of a CQICH in a CQI field defined in a UL-MAP message, and Frame offset indicating a time at which the MS actually starts reporting a CQI value after being allocated a CQICH. In addition, the CQICH Alloc IE includes Period (p) indicating a period in which the MS reports the CQI value, and Duration (d) indicating an effective time for which the MS can use the allocated CQICH.

If it is determined in step 121 that the CQICH allocation information is not received, the MS proceeds to step 123. In step 123, the MS performs a network re-entry operation with the target anchor BS and then ends the process because it failed to receive CQICH allocation information from the target anchor BS, i.e., because the MS failed to be allocated the CQICH from the target anchor BS even after the MS completed a fast switching operation from the serving anchor BS to the target anchor BS. Herein, the term "network re-entry operation" refers to an operation of acquiring synchronization with the target anchor BS and then performing initial ranging, registration and authentication.

However, if it is determined in step 119 that the CQICH allocation information to be used in the target anchor BS has been received, the MS proceeds to step 125. Also, if it is determined in step 121 that the CQICH allocation information has been received, the MS proceeds to step 125. In step 125, the MS performs a fast switching operation and communication with the target anchor BS through the CQICH allocated thereto, and then ends the process.

The FBSS-based fast switching operation of an MS in the conventional IEEE 802.16 communication system has been described so far with reference to FIG. 1. Next, with reference to FIG. 2, a description will be made of a format of an Anchor Switch Reporting (ASR) slot used in an FBSS-based fast switching operation of an MS in the general IEEE 802.16 communication system.

FIG. 2 is a diagram illustrating a format of an ASR slot used in an FBSS-based fast switching operation of an MS in a conventional IEEE 802.16 communication system. Reference numeral 201 represents transmission of a control signal from an MS to a serving anchor BS, shown on the time axis, reference numeral 203 represents transmission of a control signal from the MS and a target anchor BS, also shown on the time axis. As illustrated in FIG. 2, in the FBSS scheme, the time axis is divided in ASR slots. Each of the ASR slots is comprised of a plurality of, for example, M frames. The number, M, of frames constituting the ASR slot is determined by a BS, and the MS obtains the number, M, of frames constituting the ASR, determined by the BS, through a DCD message.

Reference numeral 205 represents an ASR slot before a fast switching operation performed with the serving anchor BS by the MS, and reference numerals 207 and 209 represent ASR slots in a switch period, for which the MS transmits a control signal used for informing the serving anchor BS of the fast switching operation from the serving anchor BS to the target anchor BS. The switch period includes one or more ASR slots. The number of ASR sots constituting the switch period is also determined by the BS, and the MS finds the number of ASR slots constituting the time switch, determined by the BS, through the DCD message. Reference numeral 211 represents an ASR slot in which the MS performs communication with the target anchor BS after performing a fast switching operation from the serving anchor BS to the target anchor BS, i.e., after completing the switching operation.

In the ASR slot 205 before a fast switching operation, in which the MS is communicating with the serving anchor BS, the MS transmits a CQI value of the serving anchor BS to the serving anchor BS every frame in the ASR slot 205 while performing communication with the serving anchor BS. In the ASR slot 205, if the MS determines that it should a perform fast switching operation from the serving anchor BS to the target anchor BS, the MS waits until termination of the corresponding ASR slot, i.e., the ASR slot 205, where it determined to perform the fast switching operation, instead of immediately performing the fast switching operation at the time where it determined to perform the fast switching.

After termination of the ASR slot 205, the MS informs the serving anchor BS for the switch period that it will perform fast switching from the serving anchor BS to the target anchor BS. In this case, the MS transmits, to the serving anchor BS, a CQI value $C_A$ of the serving anchor BS and an indicator $I_B$ indicating that it will perform a fast switching operation from the serving anchor BS to the target anchor BS. Although the indicator $I_B$ and the CQI value $C_A$ are alternately transmitted in FIG. 2 on a frame-by-frame basis, by way of example, a pattern for transmitting the indicators $I_B$ and the CQI values $C_A$ in the switch period can be variably determined by the MS. At any rate, the MS should transmit the indicator $I_B$ and the CQI value $C_A$ at least once in a first ASR slot of the switch period.

After the end of the switch period, the MS that performed the fast switching operation from the serving anchor BS to the target anchor BS, transmits a CQI value of the target anchor BS in the ASR slot 211 while performing communication with the target anchor BS.

As described above, in the FBSS scheme, the MS performs a fast switching operation from the serving anchor BS to the target anchor BS by transmitting control signals using a CQICH. However, if the MS fails to be previously allocated a CQICH from the target anchor BS after performing the fast switching operation from the serving anchor BS to the target anchor BS in the switch period, the MS should perform network re-entry with the target anchor BS as described above, causing a delay in connection setup.

If the MS fails to acquire CQICH allocation information from the target anchor BS even after performing the FBSS-based fast switching operation, the MS performs a network re-entry operation with the target anchor BS, causing a connection setup delay. Accordingly, there is a need for a scheme capable of enabling the MS to rapidly set up a connection with the target anchor BS after performing the FBSS-fast switching operation.

SUMMARY OF THE INVENTION

The present invention provides a system and method for allocating a CQICH in a communication system.

The present invention also provides a system and method for allocating a CQICH in an FBSS-based fast switching operation in a communication system.

The present invention further provides a system and method in which an MS sends a CQICH allocation request to a target anchor BS in an FBSS-based fast switching process in a communication system.

According to one aspect of the present invention, there is provided a method for allocating a channel quality information channel (CQICH) in a communication system. After performing fast switching operation from a serving anchor base station (BS) to a target anchor BS, a mobile station (MS) detects absence of a CQICH allocated from the target anger BS. Upon detecting the absence of the allocated CQICH, the MS sends a request for allocating the CQICH to the target anchor BS. Upon receiving the CQICH allocation request, the target anchor BS detects a need to allocate a CQICH to the MS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

The present invention proposes a system and method for allocating a Channel Quality Information Channel (CQICH) in a communication system. The present invention also proposes a system and method for allocating a CQICH in a Fast Base Station Switching (FBSS)-based fast switching operation in a Broadband Wireless Access (BWA) communication system. In addition, the present invention proposes a system and method, in which if a mobile station (MS) fails to be allocated a CQICH from a target anchor base station (BS) even after performing a fast switching operation from a serving anchor BS to the target anchor BS in a BWA communication system, the MS sends a CQICH allocation request to the target anchor BS and the target anchor BS allocates a CQICH to the MS in response to the CQICH allocation request from the MS. For convenience, an embodiment of the present invention will be described with reference to an IEEE 802.16 communication system, one of the typical BWA communication systems. An embodiment of the present invention can also be applied to other communication systems as well as the IEEE 802.16 communication system.

Figure 3:
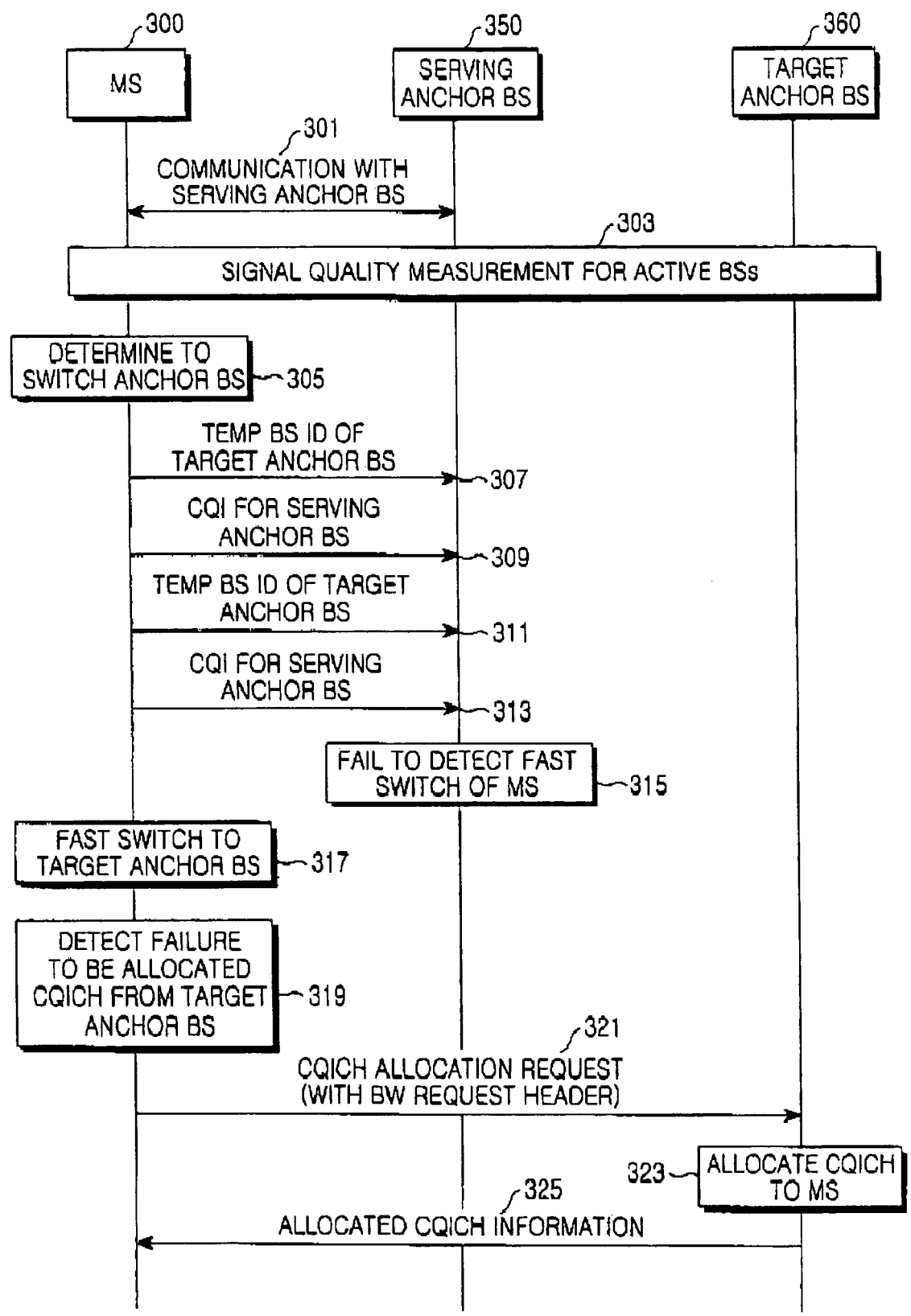
FIG. 3 is a flow diagram illustrating an FBSS-based fast switching operation in an IEEE 802.16 communication system according to an embodiment of the present invention.

FIG. 3 is a flow diagram illustrating an FBSS-based fast switching operation in an IEEE 802.16 communication system according to an embodiment of the present invention. An MS 300 performs communication with a serving anchor BS 350 in step 301. Herein, the phrase the MS 300 performs communication with a serving anchor BS 350 means that allocation information for the MS 300 is included in MAP messages (i.e., a downlink MAP (DL-MAP) message and an uplink MAP (UL-MAP) message), transmitted by the serving anchor BS 350. In the course of performing communication with the serving anchor BS 350, the MS 300 transmits a CQI value of the serving anchor BS 350 through a CQICH allocated from the serving anchor BS 350. Also, in the course of performing communication with the serving anchor BS 350, the MS 300 measures signal quality for each of active BSs constituting its own diversity set in step 303. Herein, measuring the signal quality for each of the active BSs means measuring strength, i.e., a carrier-to-interference and noise ratio (CINR) of a signal received from each of the active BSs.

The MS 300 determines to replace (switch) a serving anchor BS according to the signal quality measurement result for each of the active BSs included in the diversity set. In other words, the MS 300 determines to switch its anchor BS from the serving anchor BS 350 to a particular active BS among the active BSs (i.e., a target anchor BS 360), in step 305. Herein, the MS 300 determines to switch its anchor BS from the serving anchor BS 350 to the target anchor BS 360 if there is any active BS, i.e., the target anchor BS 360, having higher signal quality than that of the serving anchor BS 350.

Figure 1:
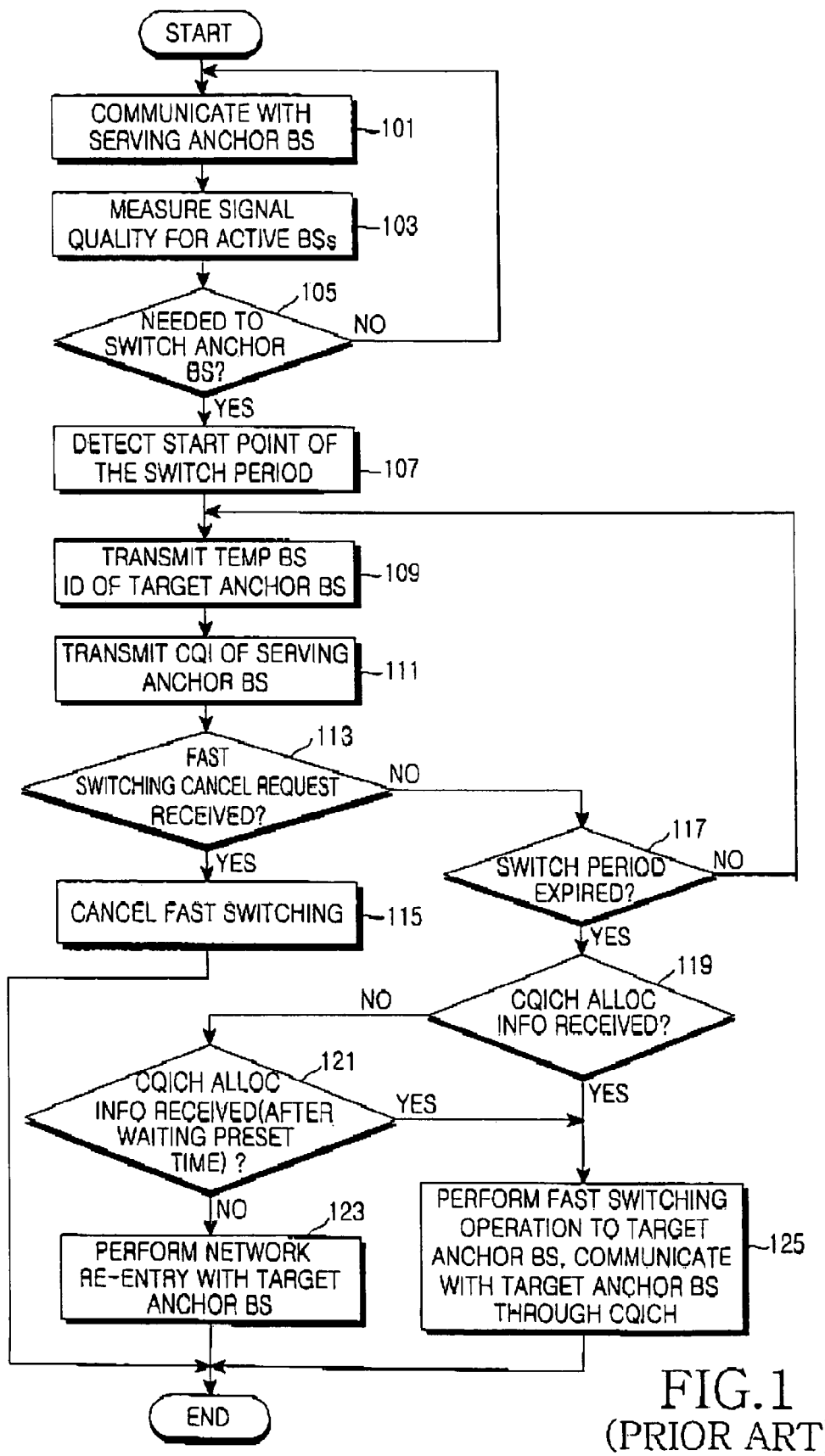
FIG. 1 is a flowchart illustrating an FBSS-based fast switching operation of an MS in a conventional IEEE 802.16 communication system.
Figure 2:
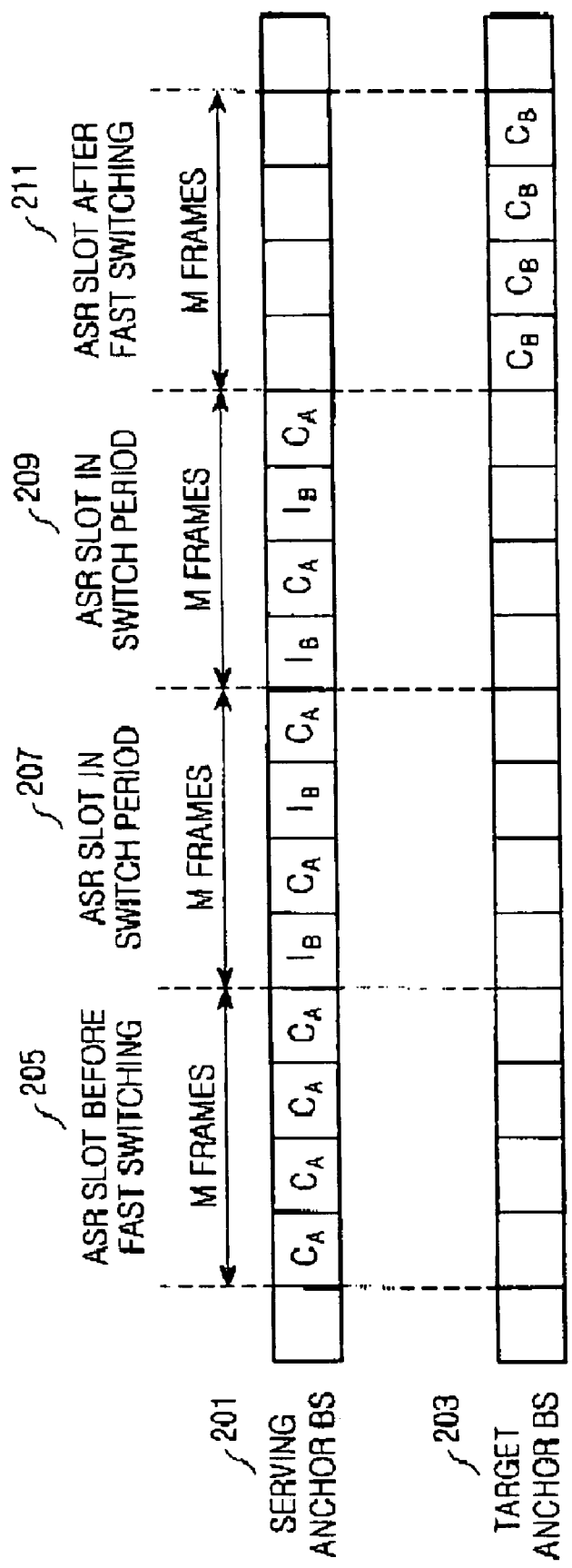
FIG. 2 is a diagram illustrating a format of an ASR slot used in an FBSS-based fast switching operation of an MS in a conventional IEEE 802.16 communication system.

Upon determining to switch its anchor BS, the MS 300 detects a start point of a switch period after termination of a corresponding Anchor Switch Reporting (ASR) slot. In the switch period, the MS 300 transmits a codeword mapped to a temporary BS indicator (Temp BS ID) of the target anchor BS 360 to the serving anchor BS 350 in order to inform that the MS will perform a fast switching operation from the serving anchor BS 350 to the target anchor BS 360, in step 307. A format of the ASR slot is to the same as the ASR slot format used in an FBSS-based fast switching operation of an MS in the conventional IEEE 802.16 communication system, described in connection with FIG. 2. Therefore, a detailed description thereof will be omitted herein for the sake of clarity. Also, the codeword mapped to the Temp BS ID has been described with reference to FIG. 1 and will note be described further for the sake of clarity.

After transmitting the codeword mapped to the Temp BS ID of the target anchor BS 360 in the switch period, the MS 300 transmits a CQI value of the serving anchor BS 350 to the serving anchor BS 350 in step 309. The operation (steps 311 and 313) of transmitting a codeword mapped to a Temp BS ID of the target anchor BS 360 and transmitting a CQI value of the serving anchor BS 350 continues until the switch period expires or an Anchor BS Switch IE indicating a fast switching cancel request to the target anchor BS 360 is received from the serving anchor BS 350 even though the switch period has not expired. The Anchor BS Switch IE has been described with reference to Table 2.

Even though the MS 300 transmitted the codeword mapped to the Temp BS ID of the target anchor BS 360 in the switch period to inform the serving anchor BS 350 that it will perform fast switching operation from the serving anchor BS 350 to the target anchor BS 360, the serving anchor BS 350 may occasionally fail to recognize the scheduled fast switching operation in step 315. The serving anchor BS 350, because it failed to detect the scheduled fast switching operation of the MS 300 to the target anchor BS 360, cannot inform the target anchor BS 360 of the scheduled fast switching operation of the MS 300.

If the switch period expires, the MS 300 performs fast switching from the serving anchor BS 350 to the target anchor BS 360 in step 317. After performing the fast switching to the target anchor BS 360, the MS 300 recognizes in step 319 that it failed to be allocated a CQICH from the target anchor BS 360. Herein, the MS 300 detects allocation information for a CQICH allocated from the target anchor BS 360 through a MAP message broadcasted from the target anchor BS 360. If there is no CQICH allocation information for the MS 300 in the MAP message, the MS 300 recognizes that it has failed to be allocated a CQICH from the target anchor BS 360.

Upon recognizing the failure to be allocated a CQICH from the target anchor BS 360, the MS 300 transmits a CQICH allocation request to the target anchor BS 360 in step 321. The MS 300 transmits the CQICH allocation request to the target anchor BS 360 by setting a Type field of a Bandwidth Request header to "111" before transmission. A format of the Bandwidth Request header transmitted for requesting CQICH allocation will be described later in detail.

Upon receiving the Bandwidth Request header with Type field="111" from the MS 300, the target anchor BS 360 recognizes in step 323 that it should allocate a CQICH to the MS 300, determining that the MS requests CQICH allocation. Therefore, the target anchor BS 360 allocates a CQICH to be used by the MS 300, and transmits information on the allocated CQICH to the MS 300 in step 325. The CQICH allocation information, i.e., CQICH Alloc IE, is broadcasted through a UL-MAP message, and a format of the CQICH Alloc IE has been described with reference to Table 3.

Although the operation of transmitting a CQICH allocation request of the MS 300 using the Bandwidth Request header has been described with reference to FIG. 3, the MS 300 can also transmit the CQICH allocation request in a method of adding Type/Length/Value (TLV) to a Ranging-Request (RNG-REQ) message transmitted in the course of performing a network re-entry operation with the target anchor BS 360. That is, upon receiving the RNG-REQ message with a CQICH Allocation Indication bit being set in TLV thereof, the target anchor BS 360 allocates a CQICH to the MS 300, determining that the MS 300 requests CQICH allocation.

Although an embodiment of the present invention has been described with reference to the method of transmitting a CQICH allocation request of the MS 300 using the Bandwidth Request header, in alternate embodiments it is also possible to define a new message or message header for requesting CQICH allocation.

The FBSS-based fast switching operation in the IEEE 802.16 communication system according to an embodiment of the present invention has been described so far with reference to FIG. 3. Next, with reference to FIG. 4, a description will be made of a format of a Bandwidth Request header for requesting CQICH allocation according to an embodiment of the present invention.

Figure 4:
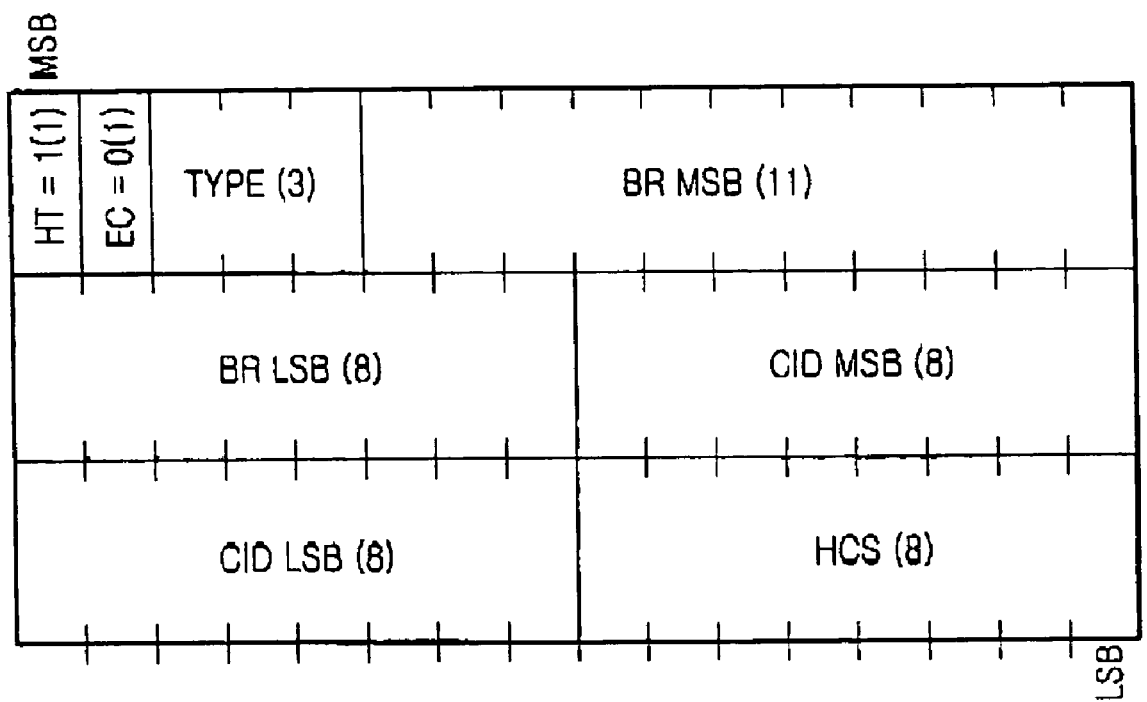
FIG. 4 is a diagram illustrating a format of a Bandwidth Request header for requesting CQICH allocation according to an embodiment of the present invention.

FIG. 4 is a diagram illustrating a format of a Bandwidth Request header for requesting CQICH allocation according to an embodiment of the present invention. The Bandwidth Request header is a Medium Access Control (MAC) header transmitted by an MS to request allocation of a bandwidth for transmitting a control signal or data, and a numeral written in each field of the Bandwidth Request header represents the number of bits constituting the corresponding field. A Header Type (HT) field of the Bandwidth Request header indicates a header type, and an Encryption Control (EC) field indicates encryption control. In addition, a Type field indicates a type of a MAC header, and a Bandwidth Request (BR) field indicates a requested bandwidth that the MS requests to be allocated. The Type field indicates a type of a corresponding bandwidth allocation request. For example, if the Type field is set to "000", it means that the bandwidth allocation request indicates "incremental". That is, it means that a value set later in the BR field indicates an additional bandwidth that the MS requests to be allocated later. For example, if the Type field is set to '000' and the BR field is set to "200" it means that the MS requests an additional 200-bit bandwidth to be allocated thereto.

If the Type field is set to "001", it means that the bandwidth allocation request indicates "aggregate". That is, it means that a value set later in the BR field indicates the needed total bandwidth that the MS was allocated. For example, if the Type field is set to "001" and the BR field is set to "800" it means that the MS is allocated an 800-bit bandwidth obtained by totaling the bandwidth allocated up to the present and the bandwidth allocated through the bandwidth allocation request.

An embodiment of the present invention sets the Type field to "111". In this case where the Type field is set to "111", after performing a fast switching operation from a serving anchor BS to a target anchor BS, an MS requests allocation of a CQICH to be used in the target anchor BS. When the Type field is set to "111", the BR field can be filled with "0" (or Null), or filled with information related to a CQI value of the target anchor BS, measured by the MS. Herein, the information related to the CQI value of the target anchor BS, measured by the MS, can be expressed with, for example, 5 bits.

A Connection Identifier (CID) field of the Bandwidth Request header indicates a basic CID of an MS, and a Header Check Sequence (HCS) field indicates a header check sequence. That is, the Bandwidth Request header is a CQICH Allocation Request header used by the MS to request CQICH allocation.

The format of the Bandwidth Request header for requesting CQICH allocation according to an embodiment of the present invention has been described so far with reference to FIG. 4. Next, with reference to FIG. 5, a description will be made of an FBSS-based fast switching operation of an MS in an IEEE 802.16 communication system according to an embodiment of the present invention.

Figure 5:
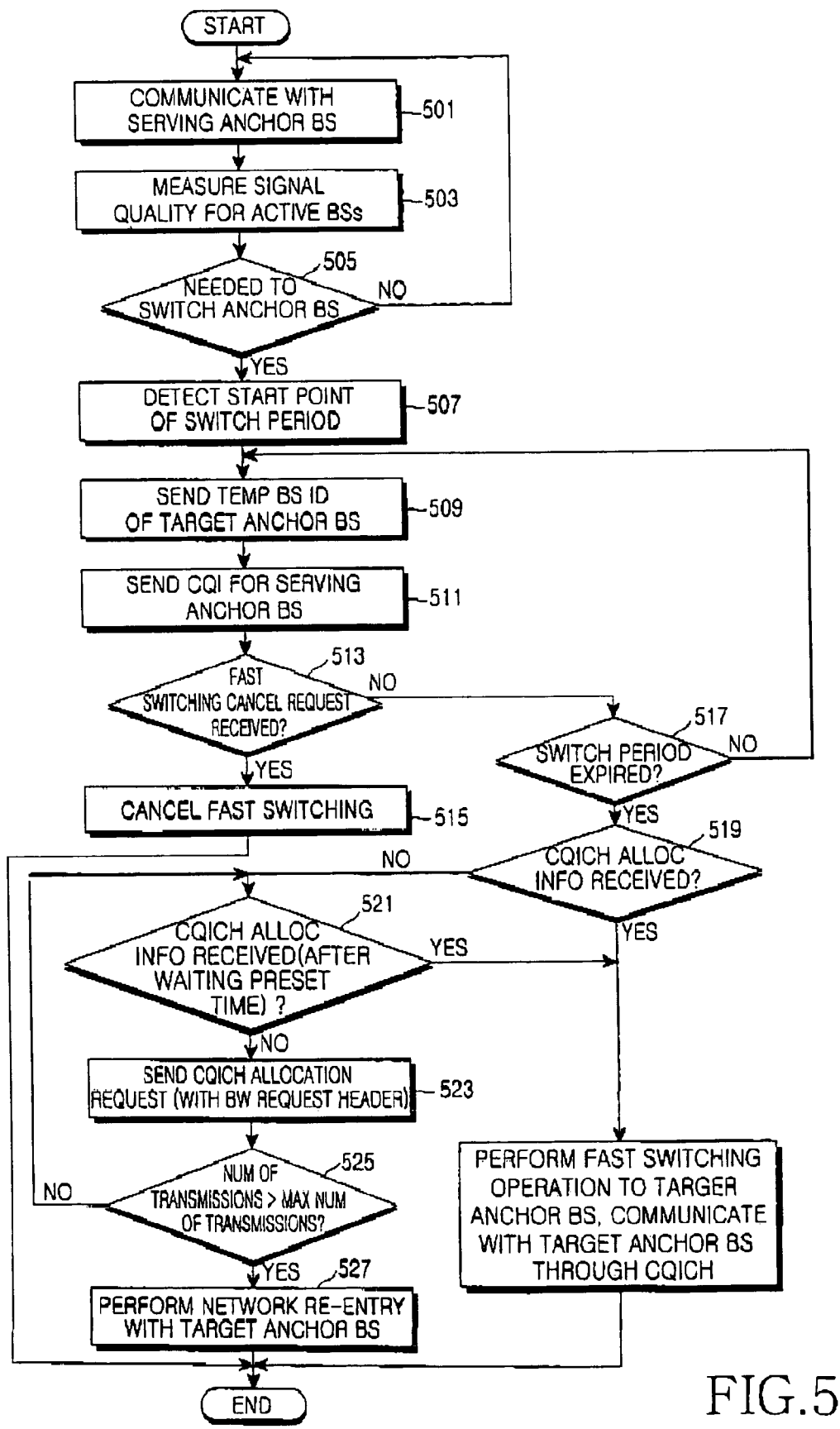
FIG. 5 is a flowchart illustrating an FBSS-based fast switching operation of an MS in an IEEE 802.16 communication system according to an embodiment of the present invention.

FIG. 5 is a flowchart illustrating an FBSS-based fast switching operation of an MS in an IEEE 802.16 communication system according to an embodiment of the present invention. Before a description of FIG. 5 is given, it should be noted that a process of steps 501 through 519 shown in FIG. 5 is substantially equal to the process of steps 101 through 119 described with reference to FIG. 1, so a detailed description thereof will be omitted herein The MS determines in step 519 whether CQICH allocation information to be used in the target anchor BS has been received from the serving anchor BS. If it is determined that the CQICH allocation information to be used in the target anchor BS has not been received, the MS proceeds to step 521 where it waits a preset time after performing a fast switching operation from the serving anchor BS to the target anchor BS, and then determines whether CQICH allocation information is received through a MAP message broadcasted by the target anchor BS within the preset time. If it is determined in step 521 that the CQICH allocation information is not received, the MS proceeds to step 523.

In step 523, the MS transmits a Bandwidth Request header for requesting CQICH allocation to the target anchor BS because the MS failed to receive CQICH allocation information of the target anchor BS, i.e., because the MS failed to be allocated a CQICH from the target anchor BS even after completing a fast switching operation from the serving anchor BS to the target anchor BS. The MS determines in step 525 whether the number of transmissions for the Bandwidth Request header is greater than the predetermined maximum number of transmissions. If the number of transmissions for the Bandwidth Request header is not greater than the maximum number of transmissions, the MS returns to step 521.

However, if it is determined in step 525 that the number of transmissions for the Bandwidth Request header is greater than the maximum number of transmissions, the MS proceeds to step 527 where it performs a network re-entry operation with the target anchor BS and then ends the process. Herein, the term "network re-entry operation" refers to an operation of acquiring synchronization with the target anchor BS and then performing initial ranging, registration and authentication.

If it is determined in step 519 that the CQICH allocation information to be used in the target anchor BS has been received, the MS proceeds to step 529. Also, if it is determined in step 521 that the CQICH allocation information has been received, the MS proceeds to step 529. In step 529, the MS performs communication with the target anchor BS through a CQICH allocated thereto, and then ends the process.

As can be understood from the foregoing description, in the BWA communication system according to an embodiment of the present invention, during FBSS-based fast switching, an MS sends a CQICH allocation request to a target anchor BS if the MS fails to be allocated a CQICH from the target anchor BS even after performing fast switching from a serving anchor BS to the target anchor BS, thereby contributing to a reduction in connection setup delay. In particular, for fast switching, the MS sends the CQICH allocation request to the target anchor BS using a Bandwidth Request header, enabling fast connection setup to the target anchor BS.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for requesting allocation of a Channel Quality Information Channel (CQICH) by a mobile station (MS) in a communication system, the method comprising:
   switching, by the MS, from a serving anchor base station (BS) to a target anchor BS;
   detecting, by the MS, an absence of a CQICH allocated from the target anchor BS; and
   upon detecting the absence of the allocated CQICH, transmitting, from the MS to the target anchor BS, a CQICH allocation request for allocating a CQICH
   wherein transmitting the CQICH allocation request comprises transmitting a CQICH allocation request header, including channel quality information (CQI) of the target anchor BS, from the MS to the target anchor BS, for requesting allocation of the CQICH.

2. The method of claim 1, wherein transmitting the CQICH allocation request comprises transmitting, from the MS to the target anchor BS, a CQICH allocation request header for requesting allocation of the CQICH.

3. The method of claim 2, wherein the CQICH allocation request header is a Medium Access Control (MAC) header having a predetermined type.

4. The method of claim 1, wherein detecting the absence of the CQICH allocated from the target anchor BS comprises:
   monitoring, by the MS, a MAP message received from the target anchor BS;
   waiting, by the MS, for CQICH allocation from the target anchor BS; and
   detecting, by the MS, the absence of the CQICH allocated from the target anchor BS when there is no CQICH allocation information in the MAP message.

5. A method for allocating a channel quality information channel (CQICH) in a communication system, the method comprising the steps of:
   after switching from a serving anchor base station (BS) to a target anchor BS, detecting, by a mobile station (MS), an absence of a CQICH allocated from the target anchor BS;
   upon detecting the absence of the allocated CQICH, transmitting a CQICH allocation request for allocating a CQICH from the MS to the target anchor BS;
   upon receiving the CQICH allocation request, detecting, by the target anchor BS, a need to allocate the CQICH to the MS; and
   allocating, by the target anchor BS, the CQICH to the MS.

6. The method of claim 5, further comprising the steps of:
   transmitting, by the target anchor BS, allocation information for the CQICH to the MS.

7. The method of claim 6, wherein the step of detecting the absence of the CQICH allocated from the target anchor BS comprises:
   monitoring, by the MS, a MAP message received from the target anchor BS;
   waiting, by the MS, for CQICH allocation from the target anchor BS; and
   detecting, by the MS, the absence of the CQICH allocated from the target anchor BS when there is no CQICH allocation information in the MAP message.

8. The method of claim 5, wherein the step of transmitting the CQICH allocation request for allocating the CQICH includes transmitting a CQICH allocation request header for requesting allocation of the CQICH to the target anchor BS.

9. The method of claim 5, wherein the step of transmitting the CQICH allocation request for allocating the CQICH includes transmitting a CQICH allocation request header including channel quality information (CQI) of the target anchor BS, for requesting allocation of the CQICH to the target anchor BS.

10. The method of claim 8, wherein the CQICH allocation request header is a medium access control (MAC) header having a predetermined type.

11. A system for allocating a channel quality information channel (CQICH) in a communication system, the system comprising:
    a mobile station (MS) for switching from a serving anchor base station (BS) to a target anchor BS, and transmitting a CQICH allocation request for allocating a CQICH to the target anchor BS, upon detecting an absence of a CQICH from the target anchor BS
    wherein the CQICH allocation request for allocating the CQICH includes a CQICH allocation request header including channel quality information (CQI) of the target anchor BS, for requesting allocation of the CQICH.

12. The system of claim 11, wherein the CQICH allocation request for allocating the CQICH includes a CQICH allocation request header for requesting allocation of the CQICH.

13. The system of claim 12, wherein the CQICH allocation request header is a medium access control (MAC) header having a predetermined type.

14. The system of claim 11, wherein the MS monitors a MAP message received from the target anchor BS, waits for CQICH allocation from the target anchor BS, and detects the absence of the CQICH allocated from the target anchor BS when there is no CQICH allocation information in the MAP message.

* * * * *